(12) United States Patent
Davis et al.

(10) Patent No.: US 7,255,366 B2
(45) Date of Patent: Aug. 14, 2007

(54) STEERING COLUMN ASSEMBLY

(75) Inventors: Alan C. Davis, Fenton, MI (US);
Richard K. Riefe, Saginaw, MI (US);
Frederick J. Berg, Auburn, MI (US);
Paul E. Balius, Flint, MI (US); Ronald H. Dybalski, Oxford, MI (US)

(73) Assignee: Delphi Technologies, Inc., Troy, MI (US)

( * ) Notice: Subject to any disclaimer, the term of this patent is extended or adjusted under 35 U.S.C. 154(b) by 457 days.

(21) Appl. No.: 10/767,683

(22) Filed: Jan. 29, 2004

(65) Prior Publication Data
US 2004/0227339 A1    Nov. 18, 2004

Related U.S. Application Data

(60) Provisional application No. 60/444,294, filed on Jan. 31, 2003.

(51) Int. Cl.
*B60R 21/16* (2006.01)
(52) U.S. Cl. ...................................... 280/735
(58) Field of Classification Search ............... 280/735; 307/10.1, 115; 200/61.54, 61.27
See application file for complete search history.

(56) References Cited

U.S. PATENT DOCUMENTS

| 4,126,202 | A  | 11/1978 | Hern |
| 4,582,156 | A  | 4/1986 | Kochy et al. |
| 4,834,422 | A  | 5/1989 | Oikawa et al. |
| 4,896,736 | A  | 1/1990 | Smith |
| 4,946,192 | A  | 8/1990 | Kuwahara |
| 5,082,078 | A  | 1/1992 | Umeda et al. |
| 5,238,286 | A  | 8/1993 | Tanaka et al. |
| 5,259,646 | A  | 11/1993 | Snyder |
| 5,280,956 | A  | 1/1994 | Tanaka et al. |
| 5,623,169 | A  | 4/1997 | Sugimoto et al. |
| 5,669,634 | A  | 9/1997 | Heinzman et al. |
| 5,707,100 | A  | 1/1998 | Suyama et al. |
| 5,809,437 | A  | 9/1998 | Breed |
| 5,911,438 | A  | 6/1999 | Anspaugh et al. |
| 6,225,582 | B1* | 5/2001 | Stadler et al. ........... 200/61.27 |
| 6,326,704 | B1 | 12/2001 | Breed et al. |
| 6,419,270 | B1* | 7/2002 | Boyle et al. ................ 280/779 |
| 6,450,532 | B1 | 9/2002 | Ryne et al. |
| 6,454,302 | B1 | 9/2002 | Li et al. |
| 6,491,322 | B1* | 12/2002 | Ryner ........................ 280/751 |

(Continued)

*Primary Examiner*—Faye M. Fleming
(74) *Attorney, Agent, or Firm*—Michael D. Smith

(57) ABSTRACT

A steering column assembly for operating a vehicle packages mechanical components and electrical devices normally found in or around the steering column of the vehicle into a single unit. An on-board processor accepts signals from the electrical devices, which may include a steering sensor, an acceleration pedal sensor, a brake pedal sensor, a turn signal switch, a cruise control switch, a windshield wiper switch, etc. The on-board processor connects to a vehicle communications bus to communicate data received from the electrical devices to various systems throughout the vehicle. The on-board processor also receives data from the various systems. The steering column assembly also includes a display connected to the on-board processor. The operator receives information about the operation of the vehicle from the display. All components, including the on-board processor, are operatively connected to a column support, allowing the steering column assembly to be installed as a unit. Therefore, the steering column assembly installs quickly into the vehicle with a reduced chance of installation error.

21 Claims, 5 Drawing Sheets

U.S. PATENT DOCUMENTS

| | | |
|---|---|---|
| 6,517,114 B1 | 2/2003 | Scheib et al. |
| 6,522,962 B2 * | 2/2003 | Millsap et al. ................ 701/41 |
| 6,575,497 B1 | 6/2003 | McCarthy et al. |
| 6,581,967 B1 | 6/2003 | Logan et al. |
| 6,591,927 B1 | 7/2003 | Honekamp et al. |
| 6,641,167 B2 | 11/2003 | Riefe et al. |
| 6,652,002 B2 | 11/2003 | Li et al. |
| 6,731,020 B2 * | 5/2004 | Burr et al. ................ 307/10.1 |
| 6,857,498 B2 * | 2/2005 | Vitale et al. ................ 180/326 |
| 2002/0170761 A1 | 11/2002 | Honekamp et al. |
| 2003/0075405 A1 | 4/2003 | Manwaring et al. |
| 2003/0075912 A1 | 4/2003 | Riefe et al. |
| 2003/0075913 A1 | 4/2003 | Li et al. |
| 2003/0226417 A1 | 12/2003 | Manwaring et al. |
| 2006/0030987 A1 * | 2/2006 | Akita ......................... 701/41 |

* cited by examiner

STEERING COLUMN ASSEMBLY

CROSS-REFERENCES TO RELATED APPLICATIONS

The subject patent application claims priority to and all the benefits of U.S. Provisional Patent Application Ser. No. 60/444,294, which was filed on Jan. 31, 2003.

FIELD OF THE INVENTION

The subject invention relates to a steering column assembly for operating a vehicle.

BACKGROUND OF THE INVENTION

Steering column assemblies for operating a vehicle are well known in the art. One such steering column assembly is disclosed in U.S. Pat. No. 6,591,927 (the '927 patent) to Honekamp et al.

The steering column assembly of the '927 patent includes numerous components typically found on or around a steering column of a vehicle. These components include a steering shaft, an accelerator pedal, a brake pedal, a clutch pedal, and a turn signal switch. The components are assembled together into a steering column assembly for quick installation into the vehicle. However, one the steering column assembly is installed, each of the components must be independently connected, either by mechanical or electrical techniques, to the several systems of the vehicle to which they are associated.

There remains a need for a steering column assembly of components for operating a vehicle that installs into the vehicle very quickly with little opportunity for installation error.

SUMMARY OF THE INVENTION AND ADVANTAGES

A steering column assembly comprises a steering column having a connection for receiving a steering wheel. A column support is coupled to the steering column for mounting the steering column to a support structure of a vehicle. At least one electrical device is operatively attached to the column support for an operator to control the vehicle. The at least one electrical device may include, but is not limited to, a steering wheel sensor, an accelerator pedal sensor, a brake pedal sensor, a turn signal switch, a windshield wiper switch, a cruise control switch, an ignition switch, a radio switch, a selector switch, and a vehicle illumination switch. An on-board processor is carried by the column support for receiving and consolidating signals from the electrical devices. The on-board processor also has an electrical outlet for connection to a vehicle communications bus for sending data to and from the vehicle communications bus.

All of the components, including the processor, are operatively connected to the support for installation in the vehicle as a unit. This allows for a very quick installation into the vehicle with little opportunity for installation error, as only one electrical connection must be made, as opposed to numerous electrical connections and mechanical linkages.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
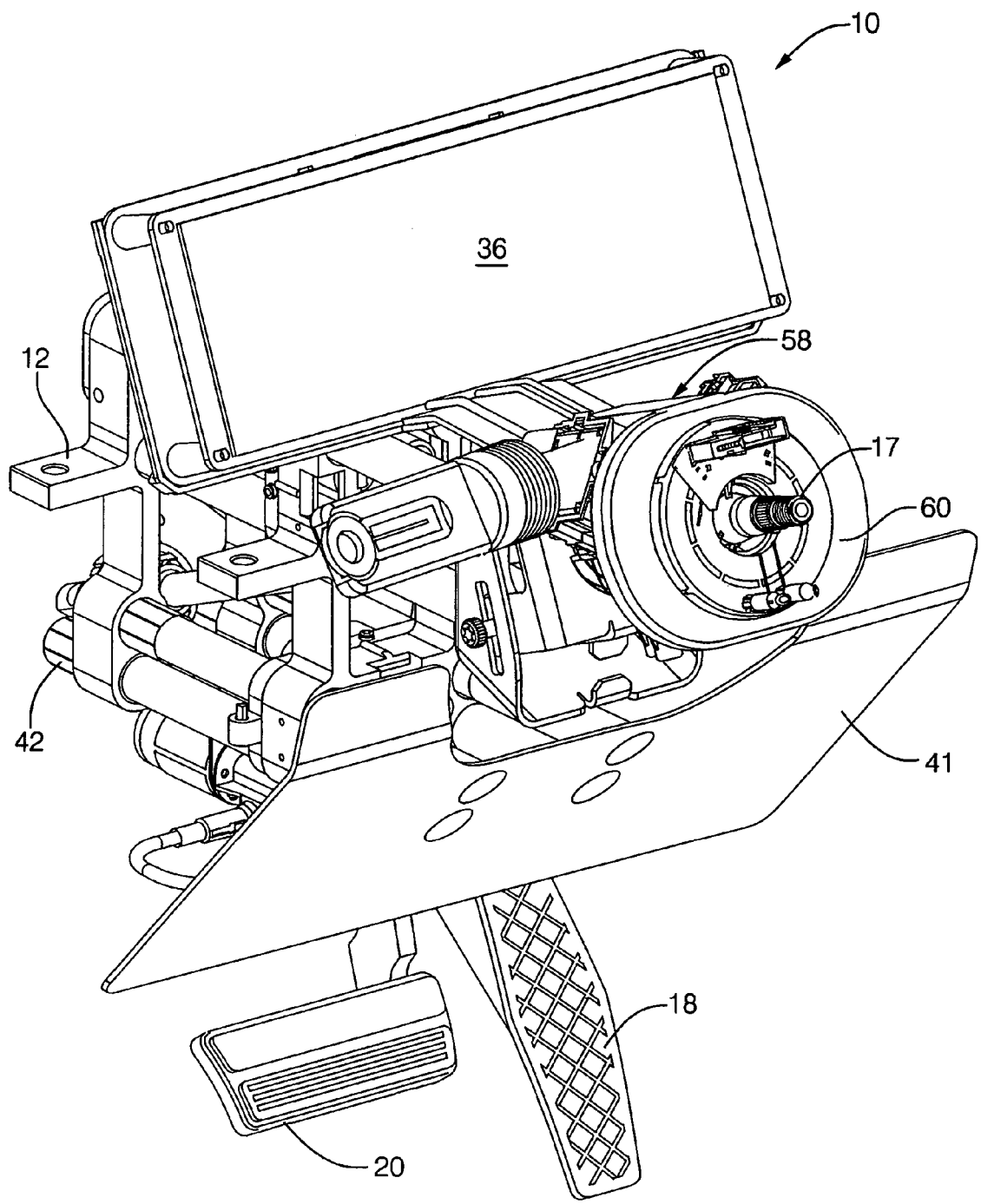
FIG. 1 is a perspective view of a steering column assembly.

Referring to the Figures, where like numerals indicate like parts throughout the several views, a steering column assembly is shown generally at 10 in FIG. 1.

Figure 2:
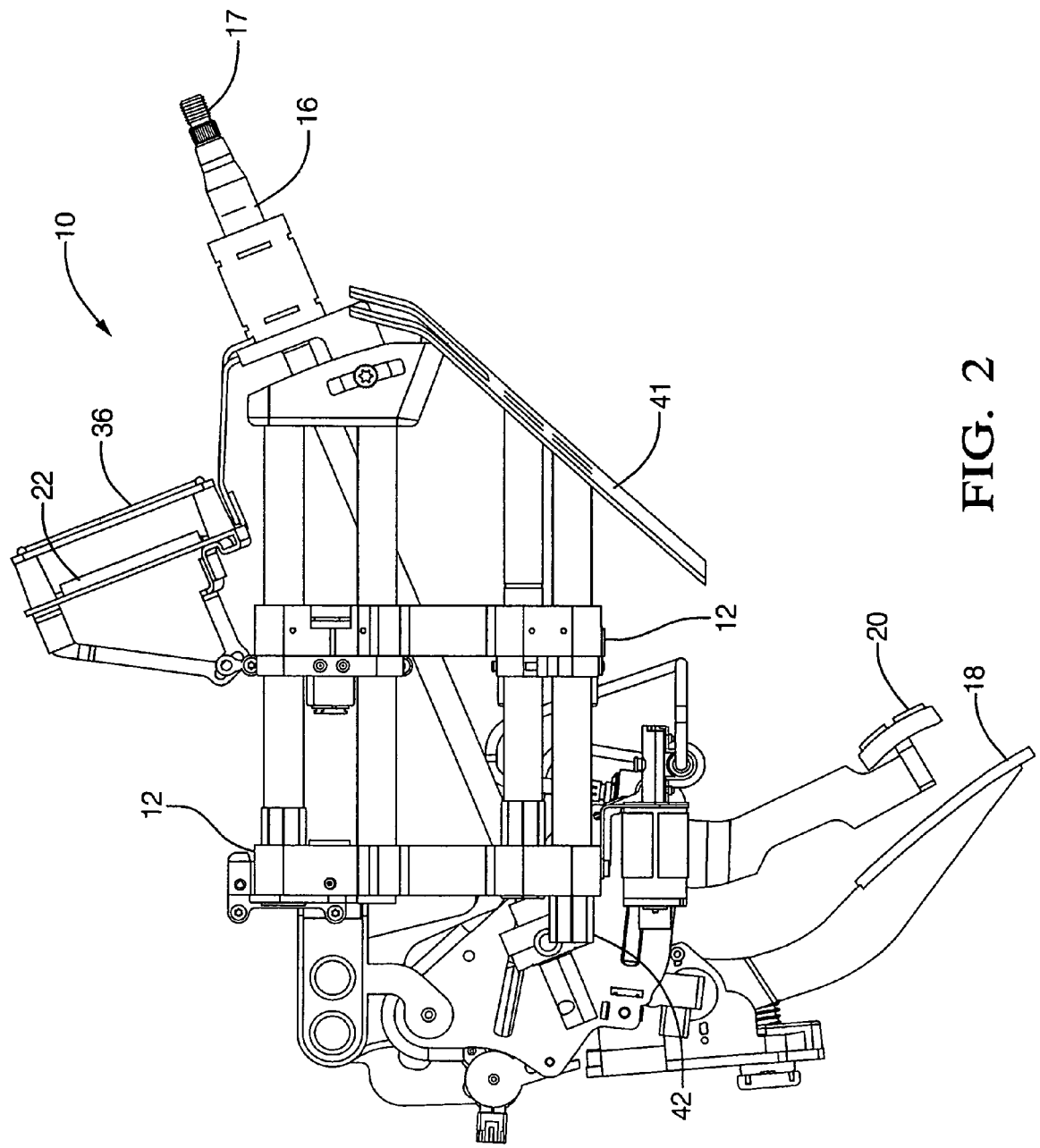
FIG. 2 is a side view of the steering column assembly.

Referring to FIG. 2, the steering column assembly 10 includes a steering column 16 with a connection 17 for receiving a steering wheel. A column support 12 is coupled to the steering column 16 for mounting the steering column 16 to the vehicle. The steering column assembly 10 is attached in an operator space of the vehicle, preferably in front of a driver's seat.

At least one electrical device 14 is operatively attached to the column support. The electrical devices 14 are used by the operator to control the vehicle and are described in more detail below.

Figure 3:
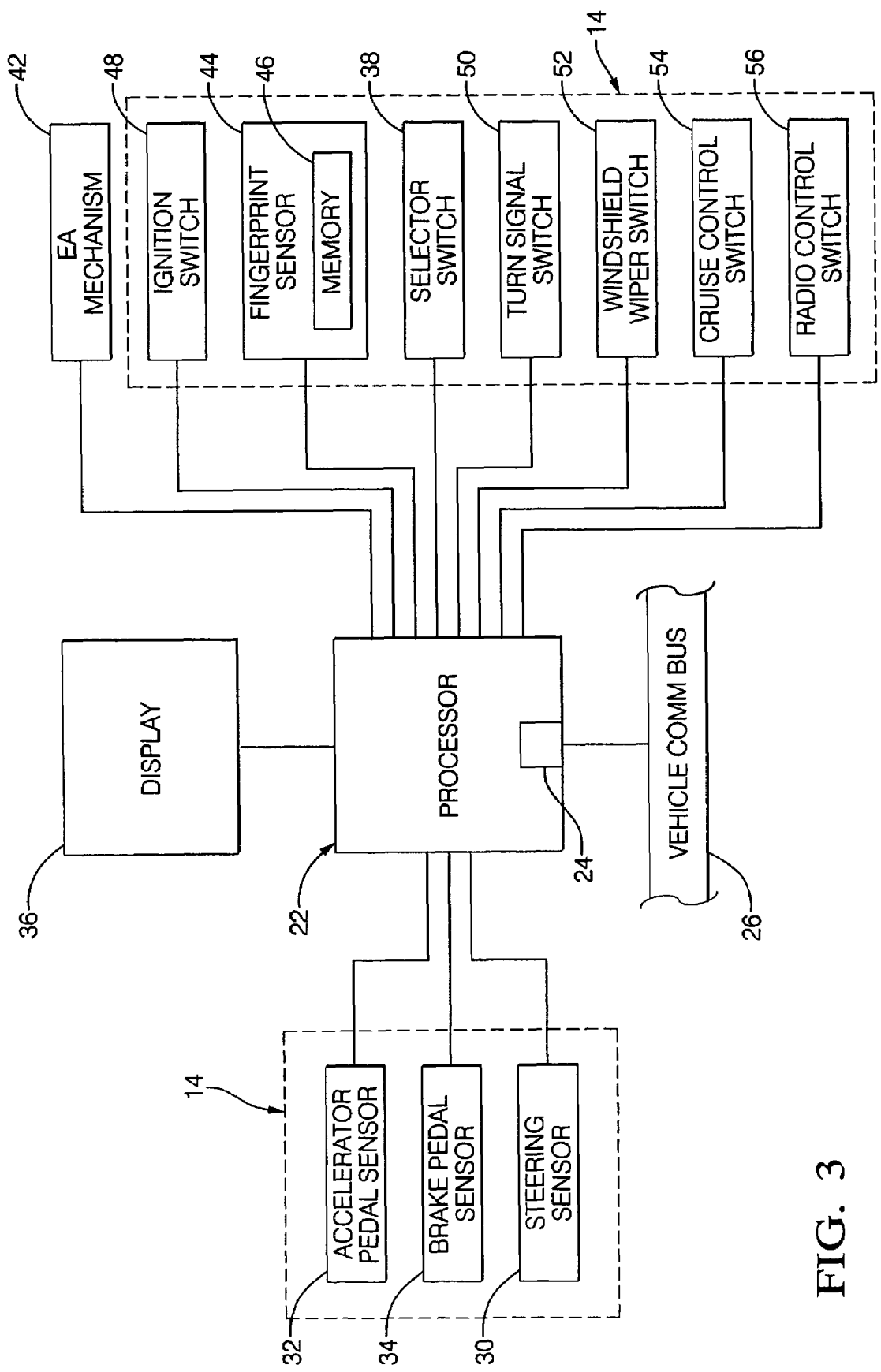
FIG. 3 is a block electrical schematic diagram of the steering column assembly.

An on-board processor 22 is carried by the column support 12. Referring now to FIG. 3, the on-board processor 22 receives and consolidates signals from the electrical devices 14. The on-board processor 22 also has an electrical outlet 24 for connecting to a vehicle communications bus 26. This connection allows the on-board processor 22 to send data to and from the vehicle communications bus 26. The vehicle communication bus 26 runs to other electronic components of the vehicle, including, but not limited to, an engine controller, a climate control module, electric brakes, a steering apparatus, a relay center, a radio, and an entertainment center.

In a preferred embodiment, at least one control pedal is pivotally supported by the column support. For example, the at least one control pedal may be an accelerator pedal 18 and/or a brake pedal 20. Those skilled in the art will appreciate that the accelerator and brake pedals 18, 20 may be either of a fixed or an adjustable type. As is the typical practice, an operator depresses the accelerator pedal 18 to add fuel to an engine of the vehicle, thus causing the vehicle to move. Brakes of the vehicle are activated to slow or stop the vehicle when the operator depresses the brake pedal 20.

In the preferred embodiment, the electrical devices 14 include a steering sensor 30, an accelerator pedal sensor 32, and a brake pedal sensor 34. The steering sensor 30 senses rotational movement of the steering wheel and sends a signal corresponding to the rotational movement of the steering wheel to the on-board processor 22. The on-board processor 22 converts the signal corresponding to the rotational movement into data which is sent via the vehicle communications bus 26 to the steering apparatus. The steering apparatus then affects mechanical movement of the wheels of the vehicle.

Likewise, the accelerator pedal sensor 32 and brake pedal sensor 34 sense the respective pivotal movements of the accelerator pedal 18 and the brake pedal 20 and send corresponding signals to the on-board processor 22. The signal corresponding to the movement of the accelerator pedal 18 is sent via the vehicle communications bus 26 to the engine controller. The engine controller controls the flow of fuel to the engine. The signal corresponding to the movement of the brake pedal 20 is sent to the electric brakes via the vehicle communications bus 26.

The preferred embodiment also includes a display 36. The display 36 is electrically connected to the on-board processor 22 for displaying data relating to operation of the vehicle. This data may be received by the on-board processor 22 from the vehicle communication bus 26 or may be generated by the on-board processor 22 from the electrical devices 14 which are electrically connected to the on-board processor 22. This data includes, but is not limited to vehicle speed, engine RPM, engine oil pressure, battery voltage, climate control settings, radio settings, cruise control settings, check engine warning, navigational information, vehicle direction, and outside temperature. A selector switch 38 is electrically connected to the on-board processor 22 for changing the data presented on the display 36 and inputting data to the on-board processor 22.

The steering column assembly 10 also includes an energy absorbing (EA) mechanism 42. The EA mechanism 42 may be electrically connected to the on-board processor 22. In the event the vehicle is involved in a collision, an energy absorption load of the EA mechanism 42 is operative to absorb the impact caused when the operator of the vehicle is propelled toward the steering column assembly 10. The EA mechanism 42 may adjust the energy absorption load of the module 10 based on physical characteristics of the operator, such as height, weight, and seat position, which are received by the EA mechanism 42 from the on-board processor 22.

The physical characteristics of the operator may be obtained by the on-board processor 22 using several different methods. In the preferred embodiment, a fingerprint sensor 44, containing a memory 46, is electrically connected to the on-board processor 22. The fingerprint sensor 44 scans the fingerprint of the operator of the vehicle to determine an identification of the operator. The memory 46 keeps records of the physical characteristics of the operators of the vehicle. The operator manually enters these records of the physical characteristics via the selector switch 38 once and need not enter them from thereon. The fingerprint sensor 44 sends the record of the physical characteristics of the operator to the on-board processor 22 for adjustment of the energy absorption load of the EA mechanism 42. In a first alternative embodiment, a key fob, typically used to unlock a door of the vehicle, contains the physical characteristics of the operator. When activated, the key fob would transmit the physical characteristics to the on-board processor 22. In a second alternative embodiment, various sensors within the vehicle are used to actively determine the physical characteristics of the operator.

The steering column assembly 10 also includes a knee bolster 41 for protecting the knees of the operator in the event of an accident of the vehicle. The knee bolster 41 is supported by the column support 12 and will assist in absorbing the impact caused when the operator is propelled toward the steering column assembly 10. Particularly, the knee bolster 41 will absorb the impact of the knees of the operator.

Another electrical device 14 preferably included in the steering column assembly 10 is an ignition switch 48. The ignition switch 48 is electrically connected to the on-board processor 22 for starting the engine of the vehicle. It is further preferred that the fingerprint sensor 44 described above be an integral component of the ignition switch 48.

When the operator whishes to drive the vehicle, he or she places his finger on the fingerprint sensor 44 for scanning. The engine of the vehicle would then start and the physical characteristics of the operator are used to adjust the EA mechanism 42.

A turn signal switch 50 is also one of the electrical devices 14 of the preferred embodiment. The turn signal switch 50 activates turn signals of the vehicle. When the turn signal switch 50 is activated a signal is sent to the on-board processor 22. The processor 22 will then send data to the relay center via the vehicle communications bus 26. The display 36 is instructed by the on-board processor 22 to show that the turn signal is activated.

It is further preferred that the electrical devices 14 a windshield wiper switch 52 and a cruise control switch 54, each electrically connected to the processor 22. The windshield wiper switch 52 is used to control a windshield wiper of the vehicle. The cruise control switch 54 controls a cruise control system of the vehicle. Other electrical devices 14 that may be electrically connected to the on-board processor 22 include, but are not limited to, a radio switch for controlling a radio system of the vehicle and a lighting switch for controlling exterior and interior lighting of the vehicle.

Figure 4:
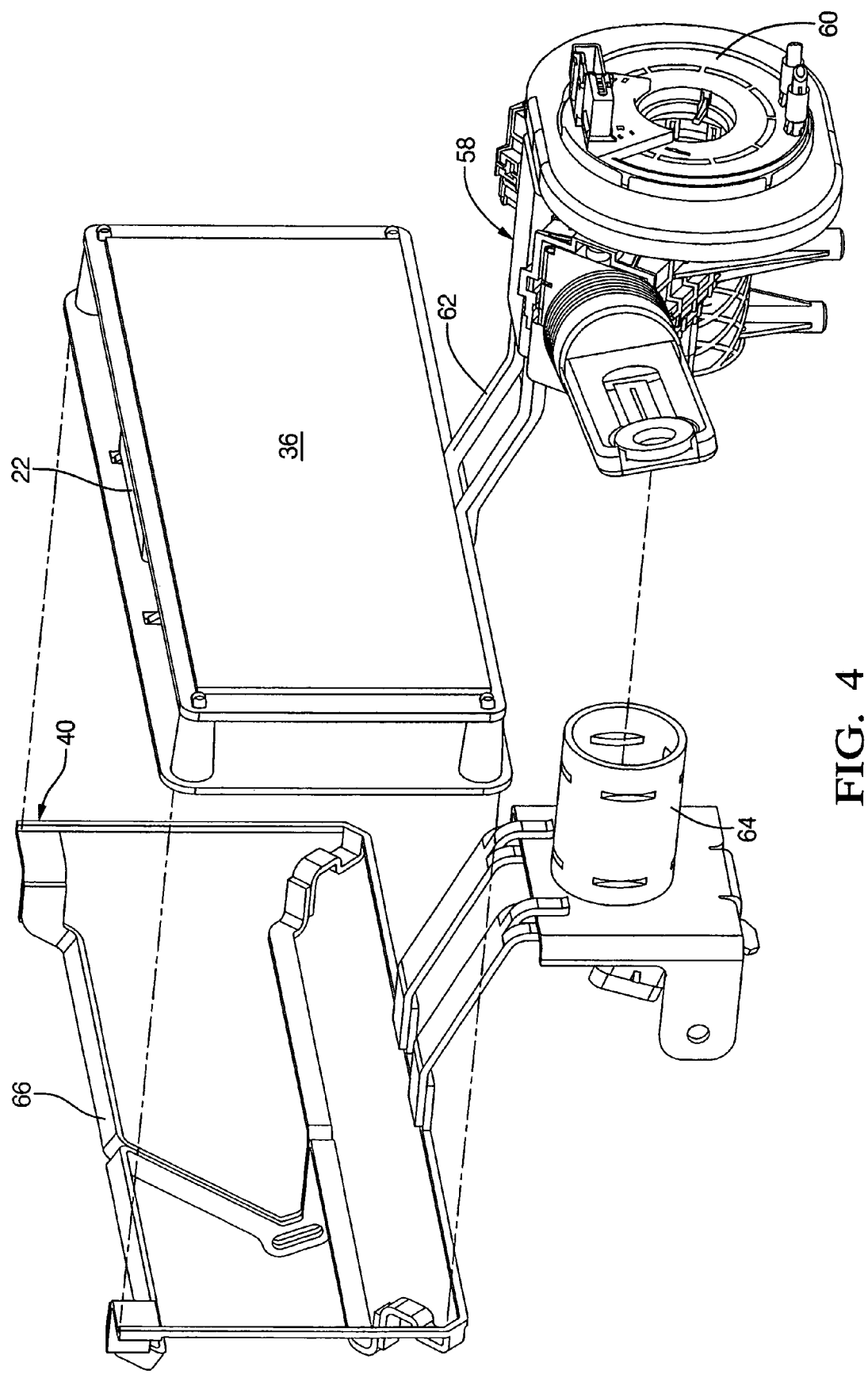
FIG. 4 is a perspective view of a cluster mechanism, a wireway, a display and an on-board processor.

In the preferred embodiment, an integrated bracket 40, as shown in FIG. 4, has a first portion 64 and a second portion 66. The integrated bracket 40 is supported by the column support. The first portion 64 supports the steering column 16. The second portion 66 supports the processor 22 and the display 36. Since the integrated bracket 40 is supported by the support column 12, vibration of the processor 22 and display 36 is significantly reduced.

Figure 5:
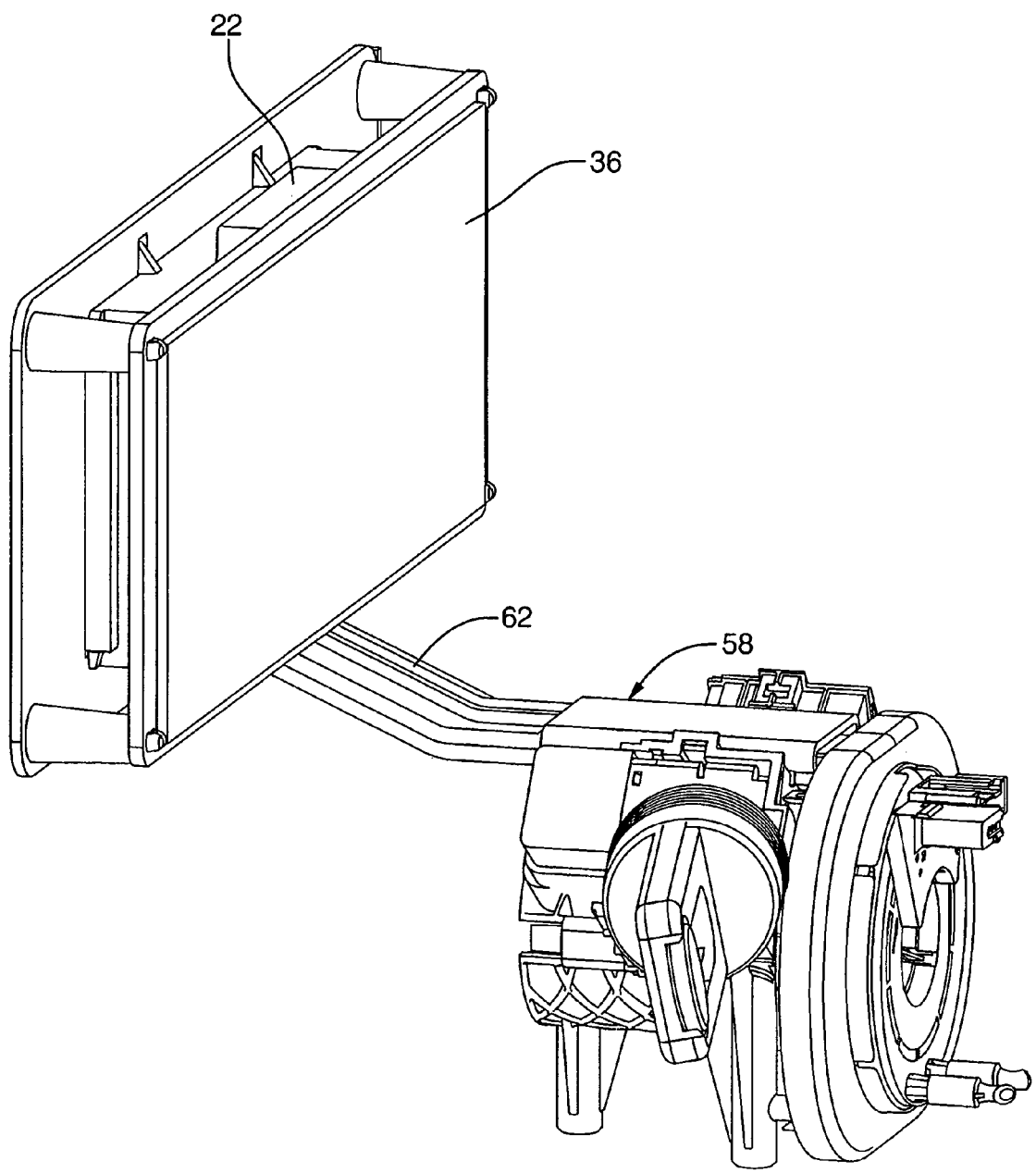
FIG. 5 is an exploded perspective view of an integrated bracket for support of a steering column, the cluster mechanism, the wireway, the display, and the on-board processor.

Referring to FIG. 5, the preferred embodiment of the steering column assembly 10 also includes a cluster mechanism 58 supported by the first portion 64 of the integrated bracket 40. The cluster mechanism 58 includes a clockspring coil 60 which provides an electrical connection between the on-board processor 22 and the steering wheel. The clockspring coil 60 is a wound bundle of wires that allows the steering wheel to turn freely while providing the electrical connection to steering wheel-mounted electrical devices 14 such as, but not limited to, a horn switch, an airbag deployment apparatus, the selector switch 38, and the radio switch. The cluster mechanism 58 also preferably supports several electrical devices 14, such as, but not limited to, the turn signal switch 50, the windshield wiper switch 52, and the cruise control switch 54. A wireway 62 electrically connects the cluster mechanism 58 to the on-board processor 22. The wireway 62 may simply support electrical conducts or, alternatively, the conductors may be embedded within the wireway 62.

The on-board processor 22 includes all components necessary to interface with the various electrical and electronic devices described herein. Such components include, but are not limited to, a microprocessor, a microcontroller, an analog-to-digital converter (ADC), a digital-to-analog converter (DAC), an application specific integrated circuit (ASIC), and a communication subprocessor.

The term "electrically connected" used throughout this application preferably defines a standard connection of conductive material to allow a flow of electrons. Alternatively, "electrically connected" can also refer to communication between devices via pulses of light over a fiber-optic cable or signals transmitted through the air, such as radio waves, infrared waves, or ultraviolet waves.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
   a steering column having a connection for receiving a steering wheel;
   a column support coupled to said steering column for mounting said steering column to a support structure of a vehicle;
   at least one electrical device operatively attached to said column support for an operator to control the vehicle;
   an on-board processor carried by said column support for receiving and consolidating signals from said electrical devices and having an electrical outlet for connection to a vehicle communications bus for sending data to and from the vehicle communications bus;
   at least one control pedal pivotally supported by said column support; and
   said at least one electrical device including a pedal sensor electrically connected to said on-board processor for sensing a pivotal movement of said control pedal.

2. A steering column assembly as set forth in claim 1 wherein said at least one control pedal is further defined as an accelerator pedal pivotally supported by said column support.

3. A steering column assembly as set forth in claim 2 wherein said pedal sensor is further defined as an accelerator pedal sensor electrically connected to said on-board processor for sensing a pivotal movement of said accelerator pedal.

4. A steering column assembly as set forth in claim 1 wherein said at least one control pedal is further defined as a brake pedal pivotally supported by said column support.

5. A steering column assembly as set forth in claim 4 wherein said pedal sensor is further defined as a brake pedal sensor electrically connected to said on-board processor for sensing a pivotal movement of said brake pedal.

6. A steering column assembly comprising:
   a steering column having a connection for receiving a steering wheel;
   a column support coupled to said steering column for mounting said steering column to a support structure of a vehicle;
   at least one electrical device operatively attached to said column support for an operator to control the vehicle;
   an on-board processor carried by said column support for receiving and consolidating signals from said electrical devices and having an electrical outlet for connection to a vehicle communications bus for sending data to and from the vehicle communications bus;
   a display supported by said column support and electrically connected to said on-board processor for displaying the data; and
   said at least one electrical device including a selector switch electrically connected to said on-board processor for changing the data presented on said display.

7. A steering column assembly as set forth in claim 6 wherein said at least one electrical device includes a steering sensor electrically connected to said on-board processor for sensing the rotational movement of the steering wheel.

8. A steering column assembly as set forth in claim 6 wherein said at least one electrical device includes an ignition switch electrically connected to said on-board processor for allowing starting of an engine of the vehicle.

9. A steering column assembly as set forth in claim 6 wherein said at least one electrical device includes a turn signal switch electrically connected to said on-board processor for activating turn signals of the vehicle.

10. A steering column assembly as set forth in claim 6 wherein said at least one electrical device includes a windshield wiper switch for controlling a windshield wiper of the vehicle.

11. A steering column assembly as set forth in claim 6 wherein said at least one electrical device includes a cruise control switch for controlling a cruise control system of the vehicle.

12. A steering column assembly as set forth in claim 6 further comprising a clockspring coil supported by said column support for providing an electrical connection between said on-board processor and the steering wheel.

13. A steering column assembly as set forth in claim 6 further comprising a knee bolster supported by said column support for protecting the operator in the event of an accident of the vehicle.

14. A steering column assembly as set forth in claim 6 further comprising an integrated bracket supported by said column support and having a first portion for supporting said steering column and a second portion for supporting said on-board processor and said display.

15. A steering column assembly as set forth in claim 14 further comprising a cluster mechanism supported by said first portion of said column support for mounting said at least one electrical device.

16. A steering column assembly as set forth in claim 15 wherein said cluster mechanism includes a clockspring coil for providing an electrical connection between said on-board processor and the steering wheel.

17. A steering column assembly as set forth in claim 15 further comprising a wireway for electrically connecting said cluster mechanism and said on-board processor.

18. A steering column assembly comprising:
   a steering column having a connection for receiving a steering wheel;
   a column support coupled to said steering column for mounting said steering column to a support structure of a vehicle;
   at least one electrical device operatively attached to said column support for an operator to control the vehicle;
   an on-board processor carried by said column support for receiving and consolidating signals from said electrical devices and having an electrical outlet for connection to a vehicle communications bus for sending data to and from the vehicle communications bus; and
   an energy absorbing (EA) mechanism electrically connected to said on-board processor for adjusting an energy absorption load of said steering column based on physical characteristics of the operator.

19. A steering column assembly as set forth in claim 18 wherein said at least one electrical device includes a fingerprint sensor electrically connected to said on-board processor for determining an identification of the operator of the vehicle.

20. A steering column assembly as set forth in claim 19 wherein said fingerprint sensor includes a memory for storing a record of said physical characteristics of the operator.

21. A steering column assembly as set forth in claim 20 wherein said fingerprint sensor sends said record of said physical characteristics of the operator to said on-board processor to adjust said energy absorption load of said EA mechanism.

* * * * *